(12) United States Patent
Sitzberger

(10) Patent No.: US 7,047,930 B2
(45) Date of Patent: May 23, 2006

(54) DRIP TRAY

(75) Inventor: Robert George Sitzberger, Milwaukee, WI (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/319,718

(22) Filed: Dec. 13, 2002

(65) Prior Publication Data

US 2004/0112324 A1 Jun. 17, 2004

(51) Int. Cl.
*F01M 1/00* (2006.01)
(52) U.S. Cl. .................................... 123/196 R
(58) Field of Classification Search ............ 123/196 R, 123/196 A, 198 DA, 198 E; 184/106
See application file for complete search history.

(56) References Cited

U.S. PATENT DOCUMENTS

| 4,505,194 A | 3/1985 | Bishop et al. ................ 99/336 |
| 4,682,672 A * | 7/1987 | Berger et al. ................ 184/106 |
| 5,417,310 A * | 5/1995 | Halseth ....................... 184/106 |
| 5,452,693 A * | 9/1995 | Clark .......................... 184/106 |
| 5,482,093 A * | 1/1996 | Tremonti et al. ........... 184/106 |
| 5,501,290 A * | 3/1996 | Volz et al. .................. 184/106 |
| 5,526,900 A * | 6/1996 | Mason ........................ 184/106 |
| 5,711,402 A * | 1/1998 | Sumpter, Sr. ............... 184/106 |
| 5,724,885 A | 3/1998 | Uy .............................. 99/341 |
| 6,101,996 A * | 8/2000 | Arita et al. ............. 123/196 A |

\* cited by examiner

*Primary Examiner*—Henry C. Yuen
*Assistant Examiner*—Jason Benton

(57) ABSTRACT

The present invention relates to a drip tray that minimizes spillage when the oil filter of an engine is removed. The tray is formed of a generally flat and flexible member which is bent to provide a concave upper surface for directing spilled oil away from the engine and/or vehicle components. The tray includes spring clips which serve to allow it to be removably attached to a ledge formed in the engine block just below the opening for the filter. The clips are provided with barbed portions that bite into and secure the tray on the ledge.

7 Claims, 2 Drawing Sheets

DRIP TRAY

FIELD OF THE INVENTION

The present invention relates to an oil filter and a drip tray which is removably attachable to an engine below its oil filter for minimizing all spillage onto the engine and/or its components when the oil filter is removed.

BACKGROUND OF THE INVENTION

Small engines such as those used on lawn and garden tractors typically have oil reservoirs with oil filters which are routinely replaced. These filters are usually secured within a threaded opening in the side of the engine so that the oil filter is in communication with the oil reservoir. When the filters are removed for replacement and/or maintenance reasons, the oil from the filter may flow out of the cartridge and spill onto the engine or vehicle components. Potentially the spilled oil could reach vehicle drive belts, clutches and/or brake mechanisms, causing them to not operate properly.

One solution has provided for a short drip tray to be attached by bolts to the engine block just below the filter opening. This solution requires that the bolt holes be cast into the engine block and then tapped to receive fastening bolts. Frequently access to the bolts is restricted, thereby making it difficult to remove and/or install the drip tray.

Another solution provides a composite drip tray which is attachable to the vehicle frame immediately below the oil filter. This solution requires that an additional punching operation be carried out in the vehicle frame to provide retention slots for the snap tabs or joints formed on the tray.

Both of these solutions require additional manufacturing steps to provide the cast and tapped holes in the engine block or the punched openings in the frame. Similarly, their removal and/or installation can be difficult and/or cumbersome and in the case of the bolted version, requires the use of tools.

SUMMARY OF THE INVENTION

To overcome these problems, there is provided a drip tray which can be attached to an existing ledge or lip provided on the engine block just below the oil filter. The drip tray is preferably comprised from thin and flexible metal sheeting to allow it to assume a concave upper surface that directs spilled oil away from the engine frame and/or components of the vehicle. The tray includes a pair of removable spring clips received in one edge of the sheet which are removably receivable on the lip or ledge of the engine block.

In the preferred embodiment, the drip tray is positioned below an oil filter which is attached to the engine block to be received and/or removed along a horizontal axis. Alternatively, the drip tray could be positioned below an oil filter that would be installed and/or removed about an axis other than horizontal. With the present invention, there is provided an inexpensive, easily installed and/or removed drip tray that requires no tools and positively directs oil spillage away from the engine, vehicle and/or their components. Further, the manufacturing costs associated with the prior solutions is eliminated.

DESCRIPTION OF THE PREFERRED EMBODIMENT

Figure 1:
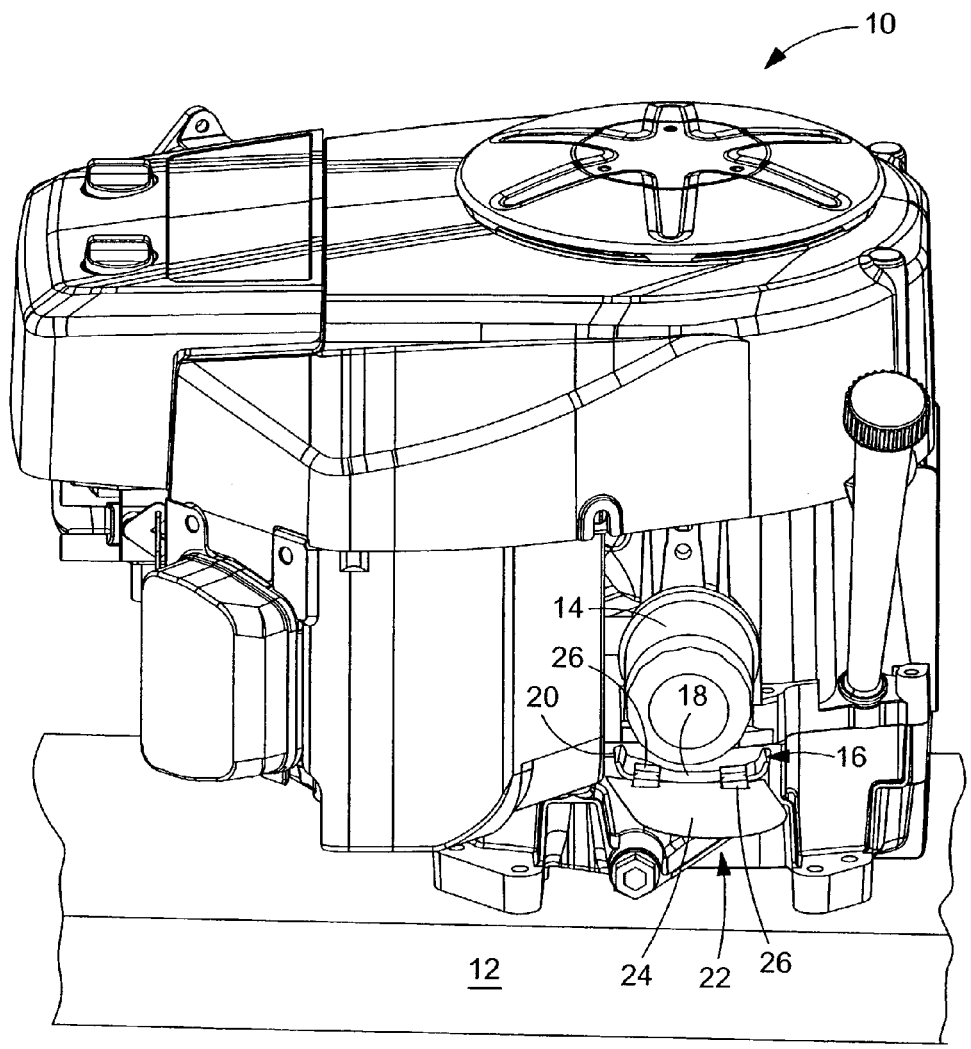
FIG. 1 is an elevated side perspective view of an engine equipped with the drip tray of the present invention.

Looking first to FIG. 1, there is illustrated an elevated side perspective view of an engine 10 carried on a vehicle frame 12. The engine 10 would include an oil reservoir therein with an oil filter 14 being in fluid communication therewith. The filter 14 is threadingly secured within a generally horizontal and upwardly extending opening located in the midportion and side of the engine 10. Immediately below the oil filter 14 is carried a ledge 16 formed on the engine. The ledge 16 is slightly curved in configuration as can be seen in FIG. 1. It includes a first upper surface 18 and a second lower surface 20.

A drip tray 22 is removably carried on the ledge 16 just below the oil filter 14. The tray 22 is comprised of a generally flat and elongated flexible sheet member 24 having fastening elements taking the form of spring clips 26. In the preferred embodiment, the sheet member 24 is thin aluminum. The elongated member 24 is configured to fit the outwardly extending ledge 16 and be bent to provide a concave upper surface that serves as a funnel to direct spilled oil away from the engine 10.

The tray 22 includes a pair of removable clips 26 which are received in slots 28 provided in one end portion of the elongated member 24. The clips 26 are formed of a spring type resilient material so that once inserted into the slots 28 of the drip tray 22, they open away from the elongated member 24 and are oriented to be received on the edge 30 of the ledge 16 formed in the engine 10.

Figure 3:
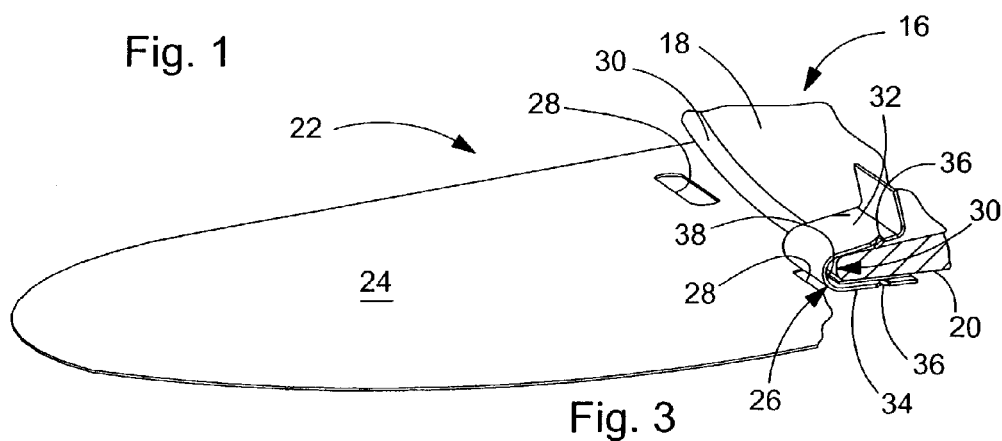
FIG. 3 illustrates an enlarged schematic partial view of the drip tray and one of the clips which attaches it to the engine.

As best shown in FIG. 3, each clip 26 includes an upper leg 32 and a lower leg 34 which is received on a respective upper surface 36 or lower surface 38 of the engine ledge 16. Each leg 32 and 34 further includes on its opposite edges, a downwardly projecting barbed portion 36. These barbs 36 serve to bite into the surfaces 18 and 20 of the ledge 16 when the clip 26 has been installed on it.

In operation, the drip tray 22 can be easily installed onto the ledge 16 provided below the opening for receiving the oil filter 14. To install the drip tray 22, the clips 26 are simply forced onto the engine ledge 16 until the throat 38 of the clip 26 abuts the edge 30 of the ledge 16. Once the clips 26 are installed, the barbs 36 serve to secure the tray 22 in place and prevent accidental removal since they bite into the faces of the upper and lower surfaces 18 and 20. If the tray 22 is to be removed, the spring clips 26 must be slightly opened so that the barbs 36 are lifted away from the surfaces 18 and 20 of the ledge 16.

Figure 2:
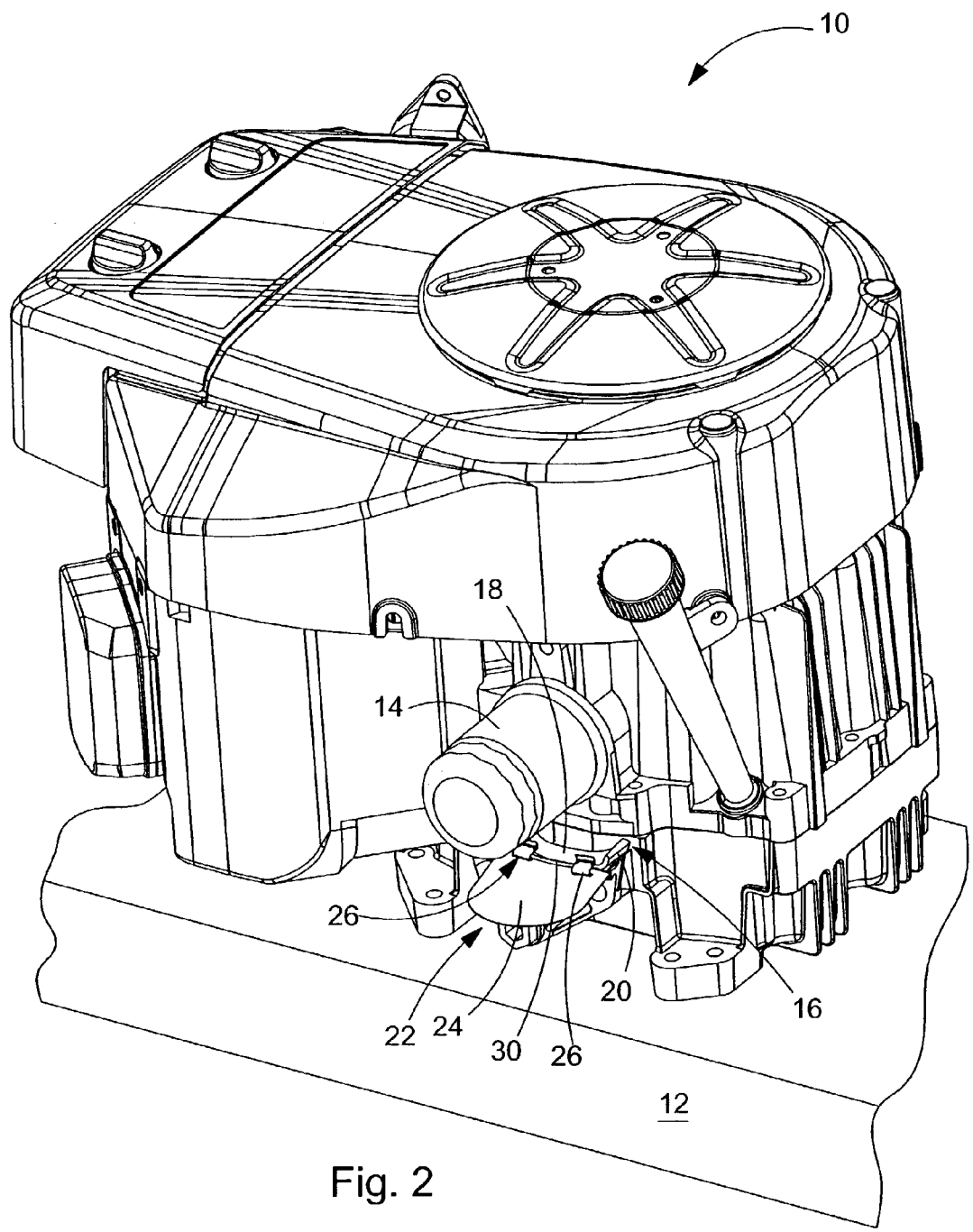
FIG. 2 is a view similar to FIG. 1, but illustrating the filter and the drip tray from a rear perspective.

Once installed, the drip tray 22 can remain on the engine 10 and provide a funnel to direct any oil which might spill from the opening when the filter 14 is removed and/or replaced. As can be seen in FIGS. 2 and 3, the drip tray 22 extends outwardly from the engine 10 and slightly beyond the frame 12. In this way, any oil which might be spilled is directed away from the engine 10, frame 12 and components such as the clutches, brakes and drives.

With the present invention there is provided an inexpensive solution that minimizes and/or avoids the spillage of oil onto the engine and/or vehicle components as well as a drip tray which can be simply and easily removed and/or installed without the use of or need of tools.

Having described the preferred embodiment, it will become apparent that various modifications can be made without departing from the scope of the invention as defined in the accompanying claims.

The invention claimed is:

1. An oil drip tray for use with an engine having
   an engine,
   an oil reservoir carried within the engine,
   an opening in communication with the oil reservoir for removably
   receiving an oil filter,
   an outwardly projecting ledge secured to the engine, said ledge being
   located below the oil filter opening; said drip tray including
   a generally flat and elongated member having a concave surface, and fastening elements coupled with the member and adapted to be removably received by the ledge to removably position the member beneath the oil filter opening; wherein the fastening elements are spring clips removably received on the flat and elongated member.

2. The invention defined in claim 1 wherein the elongated member is comprised of a thin generally flexible material.

3. An oil drip tray for use with an engine having
   an engine,
   an oil reservoir carried within the engine,
   an opening in communication with the oil reservoir for removably receiving an oil filter,
   an outwardly projecting ledge secured to the engine, said ledge being located below the oil filter opening:
   said drip tray including
   a generally flat and elongated member having a concave surface, and fastening elements coupled with the member and adapted to be removably received by the ledge to removably position the member beneath the oil filter opening; wherein the fastening elements are spring clips that have at least one barbed portion for engaging the ledge when the clip is received thereon.

4. An oil drip tray for use with an engine having
   an engine,
   an oil reservoir carried within the engine,
   an opening in communication with the oil reservoir for removably receiving an oil filter,
   an outwardly projecting ledge secured to the engine, said ledge being located below the oil filter opening:
   said drip tray including
   a generally flat and elongated member having a concave surface, and fastening elements coupled with the member and adapted to be removably received by the ledge to removably position the member beneath the oil filter opening; wherein the ledge includes first and second surfaces and the fastening elements include spring clips which have first and second spaced apart legs that are adapted to be received on the first and second surfaces of the ledge.

5. The invention defined in claim 1 wherein the ledge is located vertically below the oil filter opening.

6. The invention defined in claim 1 wherein the filter opening is located in a generally vertical surface of the engine.

7. The invention defined in claim 1 wherein the drip tray is slightly wider than the diameter of the oil filter and is slightly longer than the length of the oil filter.

* * * * *